UNITED STATES PATENT OFFICE.

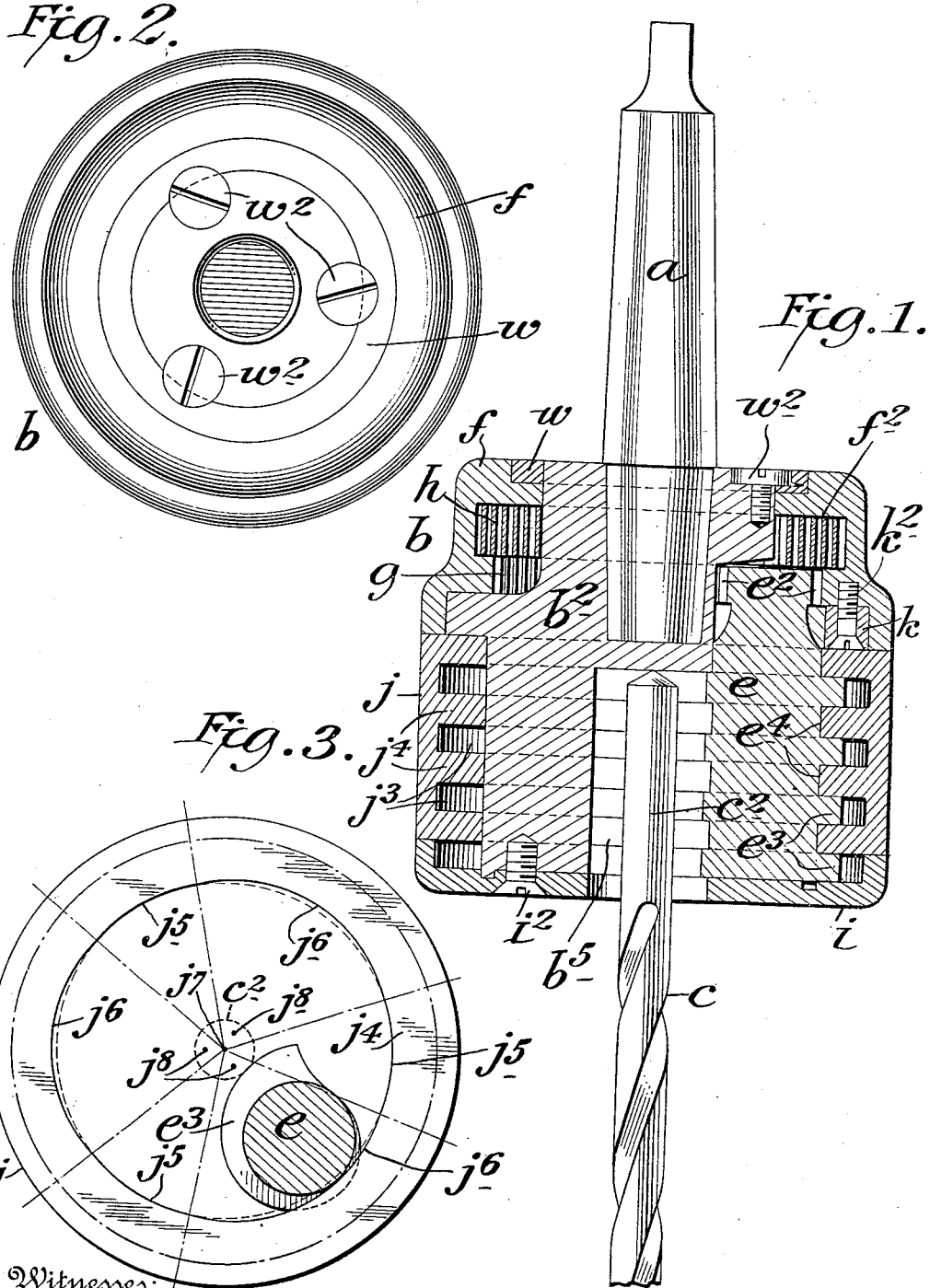

GEORGE W. EMRICK, OF BROOKLYN, NEW YORK, ASSIGNOR, BY MESNE ASSIGNMENTS, TO AUTOMATIC DRILL CHUCK CORPORATION, OF DETROIT, MICHIGAN, A CORPORATION OF MICHIGAN.

DRILL-CHUCK.

1,104,255.  Specification of Letters Patent.  Patented July 21, 1914.

Application filed May 24, 1912, Serial No. 699,484. Renewed December 24, 1913. Serial No. 808,610.

*To all whom it may concern:*

Be it known that I, GEORGE W. EMRICK, a citizen of the United States, and residing at Brooklyn, in the county of Kings and State of New York, have invented certain new and useful Improvements in Drill-Chucks, of which the following is a specification, such as will enable those skilled in the art to which it appertains to make and use the same.

This invention relates to drill chucks, and is an improvement on that described and claimed in an application for Letters Patent of the United States, filed by me April 11, 1911, Ser. #620,398, and the object thereof is to improve the form, construction and operation of the chuck described and claimed in said application, so as to reduce the wear in the operation thereof and render the same more durable or extend the life thereof.

The invention described and claimed herein is fully disclosed in the following specification of which the accompanying drawing forms a part, in which the separate parts of my invention are designated by suitable reference characters in each of the views, and in which:—

Figure 1 is a plan view of my improved drill chuck head with the chuck shank shown in section:—Fig. 2 a sectional side view of the drill chuck and showing the chuck shank and a drill tool in position, and Fig. 3 a plan view of the main casing of the chuck head and showing one of the tumblers in transverse section, and also indicating the shank of the drill or drill tool.

In the accompanying drawing I have shown only such parts of the device as are necessary to describe my present improvement, and in the following description the parts shown are given the same reference characters as in the said application, and said parts are of the same form, construction and operation, as in said application with the exceptions hereinafter pointed out.

In the accompanying drawing I have shown at $a$ an ordinary chuck shank used in connection with devices of this class, and at $b$ my improved drill chuck, in the construction of which I provide a chuck head $b^2$ an annular cap $f$, a body casing, or rotary shell $j$, and a bottom plate $i$. In the application referred to, the cap $f$ is secured to the rotary shell $j$, but in this construction said cap and rotary shell are independently rotatable. The bottom plate $i$ is secured to the bottom of the head $b^2$ by screws $i^2$, and formed in the bottom of said head is a central bore $b^5$ which is extended through the bottom plate $i$ and adapted to receive a drill $c$. Within the cap $f$ is an annular chamber $f^2$ in which is placed a helical spring $h$ below which is an annular internal gear $g$, and mounted around and in the bottom portion of the head $b^2$ and in suitable recesses, not shown herein, are vertically arranged rotary tumblers $e$ which are three in number, and these tumblers are provided at the tops thereof with gears $e^2$ which mesh with the internal annular gear $g$. The tumblers $e$ are provided with equally spaced annular cam ribs $e^3$ separated by corresponding annular spaces $e^4$, and the shell $j$ is provided with internal annular equally spaced ribs $j^4$ forming corresponding annular recesses $j^3$ in which the cam ribs $e^3$ of the tumblers $e$ operate, and all these parts in connection with others, not shown herein, are of the same construction and operation as in the application hereinbefore referred to, except as to the following modifications or changes thereof.

In this improvement the cap $f$ is held on the chuck head $b^2$ by a ring or band $w$ countersunk in said cap and secured in place by screws $w^2$ having heads countersunk in the clutch head and in said ring; and a segmental stop $k$ which limits the movement of the cap $f$ is held in place by a screw $k^2$ which connects said stop with the cap $f$ and which is arranged vertically instead of radially, as in said application.

In this improvement instead of forming the inner bearing faces of the annular ribs $j^4$ of the shell $j$ on a continuous circle, as in the application referred to, said bearing surfaces are divided into different spaces $j^5$ and $j^6$ arranged alternately, and formed on the arcs of different circles, the centers of which are at $j^7$ and $j^8$, and this gives to the bearing surface of said ribs an undulating or wave like form, and in the operation of the device the cam ribs $e^3$ of the tumblers $e$ will strike the shank $c^2$ of the drill or tool $c$ at different points on said cam ribs instead of striking said shank at the same point at all times, and in this way the wear on said cam ribs will be lessened and the duration thereof, or length of time during which said tumblers may be used, will be greatly extended.

From the foregoing description it will be seen that each of the inner bearing surfaces of the ribs $j^4$ of the shell $j$ is divided into six spaces, of which the alternate spaces are of greater radial dimensions than the other three, measured from the center of the clutch head, and this, while permitting the cam ribs $e^3$ of the tumblers $e$ to contact at different points on the shank $c^2$ of the tool, does not interfere with the operation of said tumblers.

In assembling the parts, the tumblers are first placed in the head and adjusted into a predetermined position, after which the shell $j$ is slipped on over the head and tumblers from the bottom of the head, after which the bottom plate $i$ is secured in place and the device is ready for use, all this operation being the same as in the application hereinbefore referred to.

It must be understood that the spring $h$, one end of which is secured to the cap and the other to the head, operates to normally hold the tumblers in the operative or locked position, in which position the drill $c$ is securely held and may be operated by turning the chuck in the usual manner; and it will also be understood that the entire chuck revolves with the drive shaft, with which, in practice, it is connected, and supposing said shaft should be turned to the right, if it is desired to release the drill, all that is necessary is to grasp the cap $f$ by one hand. This operation stops the rotation of said cap and holds it stationary; but it will be understood that this grasping of the cap and stoppage of the rotation thereof is only momentary and during the same the motion of the head $b^2$ of the chuck continues, and through the operation of the gear $g$ on the heads $e^2$ of the tumblers $e$, the said tumblers are rotated to the left and the drill $c$ is released and may be removed, as will be readily understood, and the fact that the shell is rotatable independent of the cap enables the undulating or wave-shaped inner surfaces of the ribs $j^4$ to operate as described in order to secure different points of contact between the spiral cams $c^3$ on the tumblers $e$ and the shank $c^2$ of the tool when said tool or the shank thereof is inserted into the head of the chuck.

It must be understood however, that the stoppage of the rotation of the cap $f$ puts the spring $h$ under increased tension and the moment said cap is released the said spring turns said cap back to its operative position, and the tumblers $e$ are again thrown into their operative position.

Having fully described my invention what I claim as new and desire to secure by Letters Patent is:—

1. A drill chuck comprising a head portion in the central bottom part of which is an axial bore around which are mounted a plurality of detachable and rotary tumblers having spiral cam ribs on one side thereof, and which do not extend entirely around said tumblers, a rotary cap mounted on said head and geared in connection with said tumblers, a helical spring placed between the rotary cap and said head and connected with each, a rotary shell adapted to be passed on over the bottom of said head and said tumblers and provided with internal annular ribs which correspond with and operate in the spaces between said cam ribs, and a bottom plate secured to the bottom of said head and holding said shell and tumblers in position, the bearing surfaces of the cam ribs in said shell being divided into separate parts, of which the alternate parts are formed on an arc of the same circle, while the other parts are formed on the arcs of circles of less diameter.

2. A drill chuck comprising a head portion in the central bottom part of which is an axial bore around which are mounted a plurality of detachable and rotary tumblers having spiral cam ribs on one side thereof, and which do not extend entirely around said tumblers, a rotary cap mounted on said head and geared in connection with said tumblers, a helical spring placed between the rotary cap and said head and connected with each, a rotary shell adapted to be passed on over the bottom of said head and said tumblers and provided with internal annular ribs which correspond with and operate in the spaces between said cam ribs, and a bottom plate secured to the bottom of said head and holding said shell and tumblers in position, said cap and said shell being independently rotatable.

3. In a drill chuck of the class described, a head portion in the central bottom part of which is an axial bore around which are mounted a plurality of detachable and rotatable cylindrical tumblers having spiral cam ribs on one side thereof and which do not extend entirely around said tumblers, a rotary shell adapted to be passed on over the bottom of said head and said tumblers and provided with internal ribs which correspond with and operate in the spaces between said cam ribs and bear on the body of said tumblers, and the bearing surfaces of which are divided into separate parts of which the alternate parts are formed on an arc of the same circle while the other parts are formed on the arcs of circles of less diameter.

In testimony that I claim the foregoing as my invention I have signed my name in presence of the subscribing witnesses this 22nd day of May 1912.

GEORGE W. EMRICK.

Witnesses:
C. MULREANY,
S. ANDREWS.

Copies of this patent may be obtained for five cents each, by addressing the "Commissioner of Patents, Washington, D. C."